Nov. 30, 1965  H. A. EHRENFREUND  3,220,058
MOLD CHARGING APPARATUS
Filed Aug. 20, 1962  3 Sheets-Sheet 2

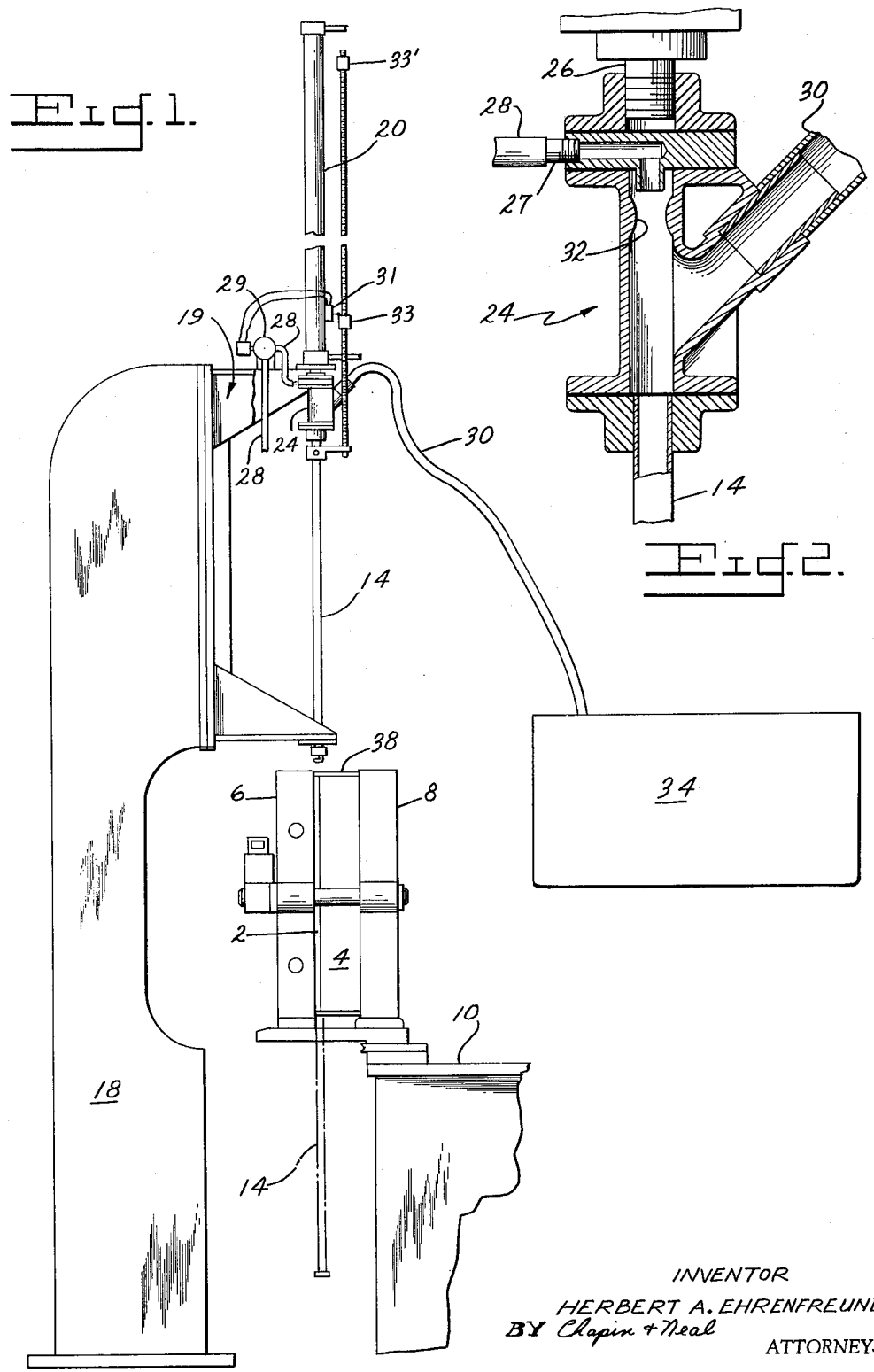

INVENTOR
HERBERT A. EHRENFREUND
BY Chapin & Neal
ATTORNEYS

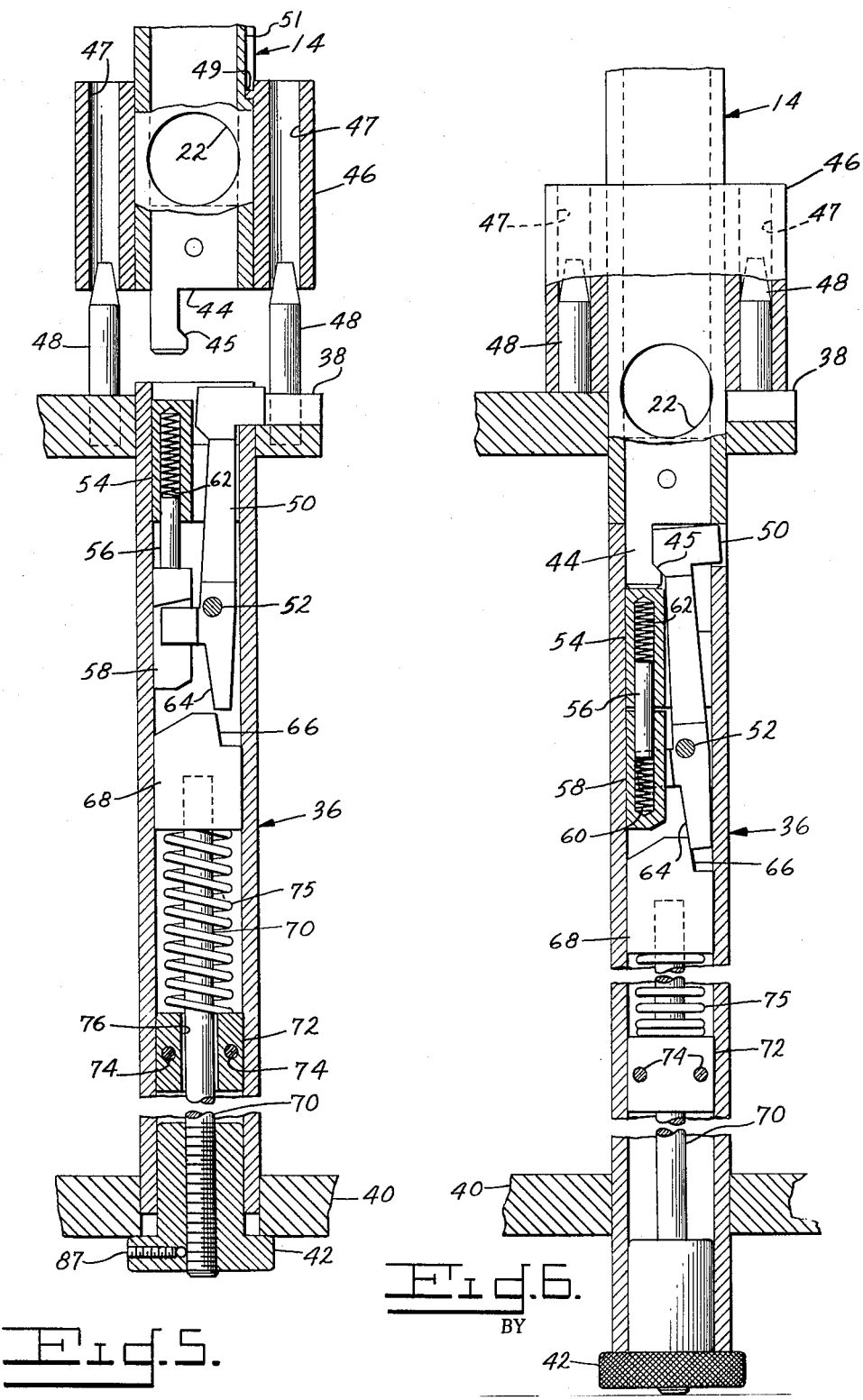

United States Patent Office 3,220,058
Patented Nov. 30, 1965

3,220,058
MOLD CHARGING APPARATUS
Herbert A. Ehrenfreund, Longmeadow, Mass., assignor to The Lodge & Shipley Company, Cincinnati, Ohio, a corporation of Ohio
Filed Aug. 20, 1962, Ser. No. 217,938
9 Claims. (Cl. 18—30)

This invention relates to molding apparatus for synthetic plastic in particle of bead form, and more particularly to means for uniformly charging either single or multi-cavity molds.

While "blow" filling is widely used for charging mold cavities with plastic beads, the apparatus and techniques heretofore available did not give entirely satisfactory results there being a high incidence of non-uniform mold charging which is particularly troublesome in multi-cavity molds.

It is the principal object of this invention to provide an improved mold charging device whereby a mold cavity is filled by direct introduction of a uniform charge of plastic beads or particles from a moving source. It has been found that superior mold charging may be achieved not by employing a moving bead source but also by successive or sequential injection of beads into the cavities of a multi-cavity mold.

It is another object of this invention to provide mold charging apparatus of the above type adapted for use with a molding machine in which the molds are intermittently moved from one station to another at which various steps in a plastic molding cycle are carried out. A machine of this type is disclosed in a copending application Serial No. 208,835, filed July 10, 1962 and assigned to the same assignee as the instant application.

The above and other objects and advantages of this invention will be more readily apparent from the following description and with reference to the accompanying drawings in which:

FIG. 1 is a side elevational view of an apparatus embodying this invention;

FIG. 2 is a cross sectional view on an enlarged scale showing a portion of the apparatus of FIG. 1;

FIG. 5 is a section, on enlarged scale, taken along lines 5—5 of FIG. 3; and

FIG. 6 is a view similar to FIG. 5 in different operative condition.

Figure 3:
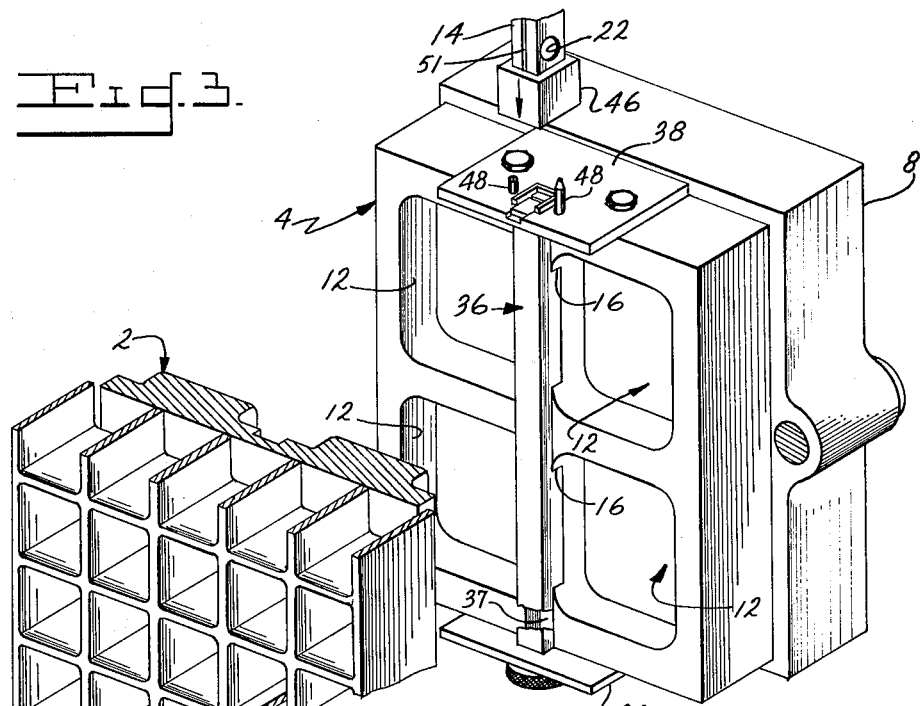
FIG. 3 is a partial perspective view showing the mold charging apparatus in retracted position.

Referring to the drawings, in FIG. 1 is shown a portion of a molding machine embodying this invention. The machine comprises a plurality of molds (only one shown), each composed of mold halves or sections 2 and 4 supported by horizontally relatively movable grids 6 and 8. The grids are mounted on a support table 10 which is periodically rotated to carry the molds to stations at which various operations in the molding cycle are carried out, such as heating, cooling, etc. A plurality of identical molds of the type shown are mounted around the periphery of the support table 10 so that the various steps in the molding cycle will be accomplished simultaneously.

In FIG. 1 the mold sections 2 and 4 are shown as located at the filling station where thermally expandable plastic particles or beads are introduced into the cavities 12 (FIGS. 3 and 4) of the mold. After the mold cavities are charged, the table 10 is indexed to carry the mold to the next station where the plastic is heated sufficiently to cause its expansion in the mold cavities.

In accordance with this invention, means for filling the mold cavities 12 comprises a conduit 14 movable into sequential registration with the gates 16 of the mold cavities 12 and movable during injection of beads into the cavities. As shown the conduit is in the form of a tube of rectangular cross section supported for vertical reciprocable movement by a frame 18 located radially outward of the table 10. The tube may be moved by any suitable means and comprises a cylinder 20 disposed on a bracket 19 extending from the frame 18 to overlie the mold.

In response to operation of cylinder 20 the tube 14 moves from a position clear of the mold, such as shown in FIG. 1, to filling positions extending into the mold in which its discharge opening 22 is registered with the gates 16 of either the lower or upper mold cavities. With the tube 14 withdrawn from the mold, as shown in FIG. 1, the table 10 may be indexed to the next station. The cylinder is preferably operated for rapid insertion of the conduit; the speed of withdrawal is set to ensure complete filling of the mold cavities.

With the filler tube opening in registration with the mold cavities, plastic beads are blown into the mold cavities by air or other suitable gas. This is accomplished by an aspirator, such as shown at 24 in FIGS. 1 and 2, the lower end of which is connected to the upper end of the tube 14 and its upper end to the piston rod 26 extending from cylinder 20.

The aspirator comprises a fitting 27 connected to an air hose 28 and a tubulation connected to a bead supply tube or hose 30. A solenoid operated valve 29 controls flow of air through the hose 28. Operation of the solenoid valve is governed by actuation of a limit switch 31 by means of blocks or sleeves 33 and 31 threaded onto a rod carried by the tube 14. The positions of the blocks 33 are vertically adjustable to adapt the apparatus for different molds and together with the limit switch, serve to start and stop the flow of air through venturi 24. The hoses 28 and 30 are flexible to permit unhindered reciprocable movement of the aspirator as the tube 14 is raised and lowered. The aspirator includes a venturi 32 which creates a partial vacuum sufficient to draw plastic beads from their storage or supply bin 34 to the aspirator where they are entrained in the stream of air flowing through the tube 14. As mentioned above, the tube 14 has a discharge opening or port registrable with the gates of mold cavities, the molds being made of an air permeable material permitting escape of the air from the cavities while retaining the beads therein.

Cooperating with the bead injection tube 14 is valve means carried by the molds to open and close the gates of the mold cavities. As shown in the drawings, the valve means comprises a runner in the form of a rod or tube 36 fitted for slidable movement in a passage or channel 37 (FIG. 3) which extends through the mold. Preferably the runner 36 is hollow so as to provide a small thermal mass which can be quickly heated and cooled so as not to cause "hot spots" during cooling. Since a hollow runner tube is capable of rapid heat transfer it contributes material to a shorter mold thermal cycle. The tube 36 has the same cross-sectional size and shape as the injection tube 14 and is held in place in one of the mold halves by means of a pair of mounting plates 38 and 40 secured to the top and bottom surfaces of the mold section 2. The tube 36 is vertically slidable in the channel 38 and is moved by movement of the filling tube 14. The adjacent ends of the tubes are provided with means for coupling and uncoupling the tubes together.

Shown in FIGS. 5 and 6 of the drawings is the means for the coupling and uncoupling of the injection tube 14 and tube 36. As shown, the tube 36 is identical to the tube 14, both being rectangular tubes. Fixed within the lower end of the injection tube 14 is a latch member 44 which includes a depending portion extending outwardly of the lower end of the tube and has a beveled toe portion 45. A sleeve 46 is disposed on the lower end of the injection tube and is provided with bores 47 located to receive dowels 48 projecting upwardly from the plate 38. The sleeve 46 is held in place on the end of the tube and slidable therealong by a projection 49 which extends into a slot 51. The slot extends axially of the tube a sufficient distance to permit a full stroke into the molds. The dowels 48 serve to guide the filler tube which is slidable relative to the sleeve into accurate registration with the rod 36 for proper intercoupling thereof. Disposed within the tube 36 is a latch lever 50 pivotable about a pin 52 which is supported by opposed wall portions of the tube. The latch lever 50 is maintained in its coupling position by means of a sleeve 54 telescoped over plunger 56, the lower end of which is disposed within the bore of a mounting block 58 secured to the inner wall of the tube 36. Coil springs 60 and 62 are fitted into the bore of the block 58 and in the sleeve 54. The lower end of the latch lever 50 has a tapered cam surface 64 which engages similarly tapered surface 66 on a block 68 slidably disposed within the tube 36.

The block 68 is fitted onto the upper end of a rod 70, the lower end of which is threaded into the flange 42. Intermediate the ends of the rod 70 is a block 72 fixed in place in the tube by means of cross pins 74. A coil spring 75 is seated between the lower surface of the block 68 and the upper surface of the stationary block 72. The rod 70 is slidable in bore 76 extending through the block 72.

In operation when the cylinder 20 lowers the filler tube the lower surface of the latch 44 engages the upper surface of the sleeve 54. Continued downward movement of tube 14 causes springs 60 and 62 to be compressed enabling the lower edge of the tube 14 to contact the upper edge of the tube 36, as shown in FIG. 6. Further movement of the tube 14 pushes tube 36 downward until the lower edge contacts the flange 42. This movement is sufficient to bring the cam surface 64 of the latch lever 50 into contact with the cam surface 66 of the block 68. The block 68 is moved downwardly compressing spring 75 and at the same time is pivoted into interlocking engagement with the toe of latch 44, as shown in FIG. 6. The spring 75 and block 68 wedge the latch in its coupled position. In this connection, flange 52 is rotatable to adjust the position of the block 68 to insure accurate coupling of the filler tube 14 and the tube 36 at the desired position in the operating cycle. A set screw 87 is provided to hold the flange in a selected position.

Figure 4:
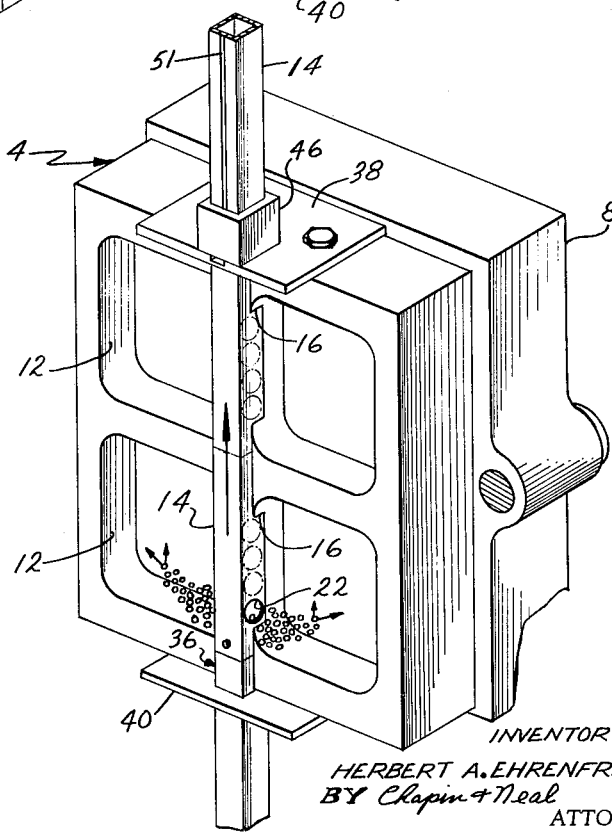
FIG. 4 is a perspective view similar to FIG. 3 with the mold charging apparatus in mold filling position.

Operation continues with tube 14 moving downwardly pushing tube 36 until discharge ports or openings 22 are registered with the lower ends of gates 16 of the lower mold cavities 12. At this point the limit switch 31 is actuated by the block 33' and valve 29 is opened to permit air to flow through the aspirator 24 into tube 14. Substantially simultaneously the actuation of limit switch 31 causes the piston in cylinder 20 to reverse its direction of movement retracting the injection tube 14. Velocity of the air is such that the beads are sucked from bin 34 quickly filling the lower mold cavities as the injection tube is moved upwardly. Since the tube 36 is coupled to the filler tube as the latter is withdrawn, tube 36 is also retracted whereby the mold cavities are closed as they are filled. Continued upward movement of the tube 14 brings the discharge openings into registration with the lower ends of the upper gates 16. These cavities are similarly filled with plastic beads. Tube 14 moves at a speed related to the volumetric rate of discharge of beads therefrom and the size of the mold cavities to achieve total filling of each mold cavity during a passage of discharge port 22 from the lower to the upper end of a mold gate. The orifices 22, as best shown in FIG. 4, transit the gate 16 as beads are blown into the mold cavity. The effect is a moving bead source which gives a varied air pattern within each cavity substantially eliminating the occurrence of air pockets or voids which frequently result from stationary bead feed. The beads are thus not only blown into the cavity but are uniformly distributed by the moving injector. Substantially similar results may be obtained by incrementally moving the orifice across the gate in steps although in the embodiment shown the movement is at a constant velocity. The effect of mobile bead injection is to impart a velocity to the beads which is the resultant of the component imparted by the air and by the moving tube.

Continued upward movement of tube 14 brings the lower block into contact with limit switch 31 cutting off air flow through the venturi 24. The flange 42 contacts the mounting plate 40 and movement of the tube 36 is continued to the position shown in FIG. 5 causing uncoupling of the latch members 44 and 50. Uncoupling is accomplished by cam surface 64 being retracted from its contact with surface 66 of the block 68.

During withdrawal of tube 14 from the mold when the bead discharge openings are closed in transit from the lower to upper mold cavities, the air flow is diverted from tube 14 into hose 30 whereby beads are blown back into the storage bin 34. The same thing happens at the upper end of the mold before the air flow is cut off whereby the beads are cleared from the lines and returned to the unit 34.

With continued movement of the filler tube 14, the portion 45 of latch 44 pivots latch lever 50 outwardly to disconnect the two tubes. Sleeve 54 follows the latch 44 upwardly to retain the latch 50 in its FIG. 5 position ready for coupling with the next mold.

It is thus seen that apparatus embodying this invention performs the mold filling operation by sequential injection, that is direct introduction of beads into each cavity of multi-cavity molds from a moving injection head. The sequential filling is carried out from one end to the other end of the mold which as shown is from the lower to the upper end. In this way each mold cavity is in direct communication with the bead supply or storage bin via hose 30 and tube 14 and the incidence of voids is avoided by multi-directional or mobile bead injection in each cavity.

In contrast to the apparatus heretofore provide for mold charging, it has been found that this apparatus ensures accurate and total filling of each and all the cavities and minimizes the incidence of defective molding particularly troublesome in high speed multi-cavity molding operations.

While a multi-station molding system is contemplated to utilize fully the advantages of this invention a single station press could also be used to great advantage. With the single station system no coupling system is needed.

Also within the scope of this invention is the location of the filler channel anywhere in the mold not necessarily limited to the parting line.

What is claimed is:

1. Mold charging apparatus comprising in combination a mold charge, at least one mold cavity with a gate opening into said cavity, a conduit having a discharge opening, means for gas entraining plastic particles through said conduit, means for moving said conduit relative to said gate, the size of said gate in the direction of movement of the conduit being substantially greater than the discharge opening of the conduit whereby said cavity is filled through said gate from a moving particle injection source.

2. Mold charging apparatus comprising in combination mold sections which when closed form a plurality of mold cavities, a channel provided in at least one of said mold sections, gates opening into each of said cavities from said channel, a conduit slidable in said channel for conducting air-entrained beads into said cavities, said conduit having a discharge opening, and means for moving said conduit in said channel to register sequentially said discharge opening with the gates of said mold cavities.

3. Mold charging apparatus comprising in combination at least one pair of mold sections which when closed form a plurality of mold cavities, a channel in at least one of said mold sections extending from one end to the other of said mold sections, gates opening into said mold cavities from said channel, a conduit slidable in said channel for conducting air-entrained beads into said cavities, said conduit having a discharge opening, means for moving said conduit in said channel to register said discharge opening with said gates sequentially from one to the other end of said mold sections, and a rod carried in said channel and movable in response to movement of said conduit for opening and closing the gates of said cavities.

4. Mold charging apparatus as set forth in claim 3 in which said conduit is discrete from said mold sections, and means for coupling and uncoupling said rod and conduit whereby said rod is displaced by inward movement of said conduit into said channel and retracted by withdrawal of said conduit.

5. Mold charging apparatus as set forth in claim 4 in which said gates extend over a substantial length of said mold cavities.

6. Mold charging apparatus as set forth in claim 5 in which said discharge opening is substantially smaller in length than said gates whereby filling of said cavities is accompanied by moving said opening along said gate.

7. Mold charging apparatus as set forth in claim 6 in which said plastic beads are air-entrained by an aspirator disposed in communication with said conduit.

8. Mold charging apparatus as set forth in claim 7 in which said rod and conduit have the same external configuration.

9. Mold charging apparatus as set forth in claim 8 in which said rod is hollow to permit rapid heating and cooling of the molds.

References Cited by the Examiner
UNITED STATES PATENTS

| | | | |
|---|---|---|---|
| 2,468,672 | 4/1949 | Judell | 18—30 X |
| 2,862,529 | 12/1958 | Rosenblatt et al. | 141—67 |
| 3,028,625 | 4/1962 | Dawson | 18—48 |
| 3,139,466 | 6/1964 | Couchman | 18—5 X |

J. SPENCER OVERHOLSER, *Primary Examiner.*

ROBERT F. WHITE, WILLIAM J. STEPHENSON,
*Examiners.*